May 17, 1927.
A. H. ROGERS
1,629,415
HOE
Filed July 29, 1926
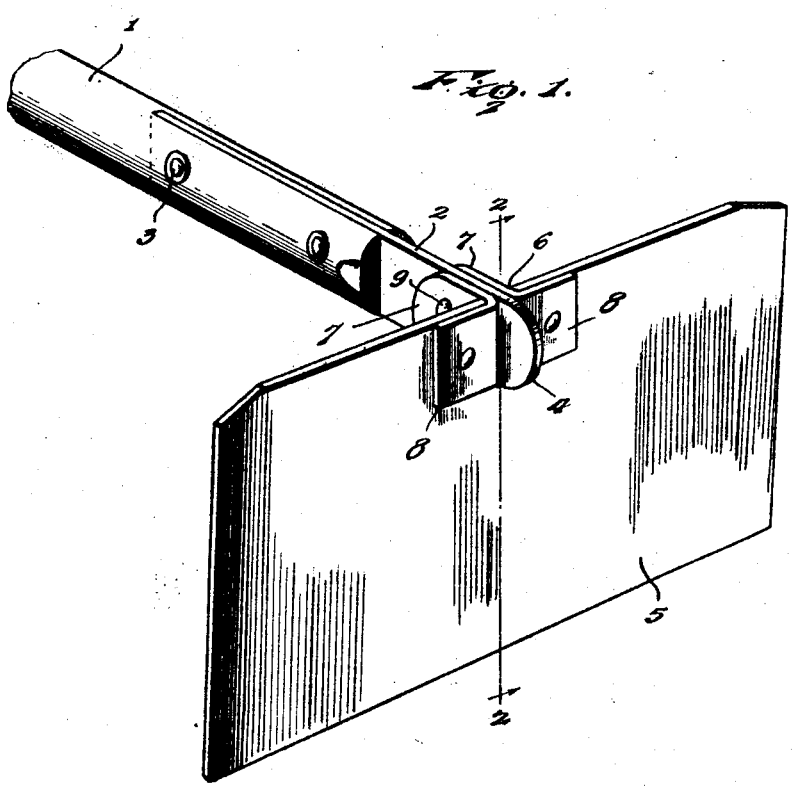
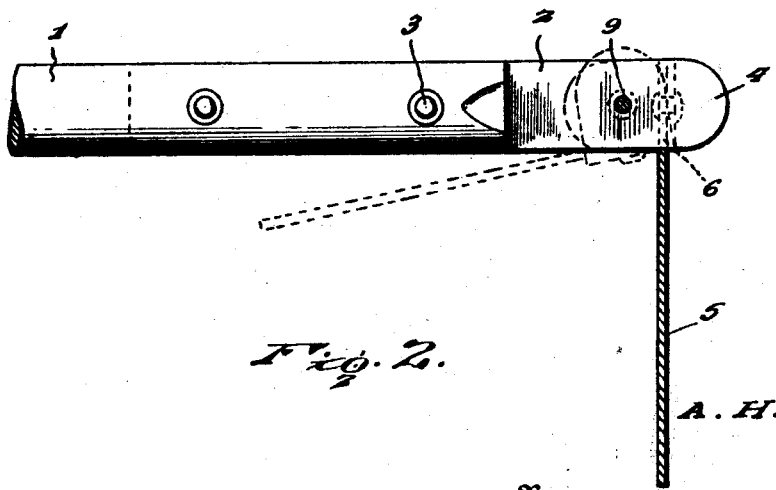
Inventor
A. H. Rogers.
By Lacey & Lacey, Attorneys Patented May 17, 1927.

1,629,415

UNITED STATES PATENT OFFICE.

ALLEN H. ROGERS, OF WESTMORELAND DEPOT, NEW HAMPSHIRE.

HOE.

Application filed July 29, 1926. Serial No. 125,781.

The invention provides an implement which may be used for mixing materials and products or as an ordinary garden hoe, said implement including a handle and a pivoted blade, the latter folding when the implement is pushed forward and occupying a position about at right angles to the handle when the implement is drawn backward.

The invention results in the provision of an implement whereby grain, fertilizer and materials may be expeditiously mixed whether upon a surface or in a container by a simple forward and backward movement of the implement without any lifting thereof and with the expenditure of a minimum amount of energy.

While the drawings illustrate a preferred embodiment of the invention it is to be understood that in adapting the means to meet specific needs and requirements, the design may be varied and such other changes in the minor details of construction may be resorted to within the scope of the invention as claimed, without departing from the spirit thereof.

For a full understanding of the invention and the merits thereof, reference is to be had to the following description and the drawings hereto attached, in which,—

Figure 1 is a perspective view of a hoe embodying the invention, and

Figure 2 is a detail sectional view on the line 2—2 of Figure 1, the full lines showing the blade perpendicular to the handle and the dotted lines indicating a folded position of the blade resulting upon pushing the hoe forwardly.

Corresponding and like parts are referred to in the following description and designated in both views of the drawings by like reference characters.

The numeral 1 designates a handle to which a shank 2 is fitted by being inserted in a slot or kerf formed in an end portion thereof, and retained in place by means of rivets 3 passing through registering openings formed in the shank 2 and portions of the handle upon opposite sides thereof. The projecting end of the shank 2 is made rounding as indicated at 4.

The hoe blade 5 is formed in its upper edge portion with a slot 6 through which the end portion of the shank 2 projects. Said slot 6 is disposed at a point midway between the ends of the blade 5. Angle irons are secured to the blade 5 upon opposite sides of the slot 6 and each of the angle irons comprises a wing 7 and a wing 8, the latter being riveted to the blade 5 upon its forward side, and the wing 7 passing through the slot 6 and engaging a side of the shank 2 and receiving a rivet or like fastening 9 which passes through registering openings formed in the wings 7 and shank 2. By having the wings 8 disposed against the forward side of the blade 5 they operate to reinforce said blade adjacent the slot 6. The slot 6 is of a depth and the shank 2 pivoted to the wings 7 at a point so that when the blade 5 is perpendicular to the handle, as indicated by the full lines in both figures of the drawings, the lower edge of the shank 2 will engage the lower closed end of the slot 6 and hold the blade in operative position when the implement is drawn rearwardly when the hoe is in service.

When the implement is pushed forwardly, the blade folds and assumes the position substantially as indicated by the dotted lines in Figure 2, hence very little resistance is offered to the advance of the hoe but when the implement is drawn rearwardly, the blade 5 assumes a position perpendicular to the handle, thereby moving the material in a manner well understood. A thorough mixing of materials may be effected by a simple forward and backward movement of the hoe, the blade 5 feathering on the advance stroke and assuming and maintaining an operative position on the backward or return stroke.

Having thus described the invention, I claim:

1. An implement of the character specified comprising a blade having an open slot in its upper edge portion, wings projecting from the blade in line with opposite sides of the slot, and a handle extending between the said wings and through the slot of the blade and pivoted to said wings to hold the blade substantially perpendicular to the handle when the implement is drawn rearwardly and to admit of the blade feathering when the implement is pushed forwardly.

2. An implement of the character specified comprising a blade having an open slot in its upper edge portion, angle irons disposed with corresponding wings passing through the slot of the blade and the other wings overlapping the blade at opposite sides of the slot and secured thereto, and a handle having a portion passing through the slot of the blade and between the wings of the angle irons projecting from the blade and pivoted to said wings, the parts being disposed to hold the blade perpendicular to the handle when the implement is drawn rearwardly and to admit of the blade feathering when the implement is pushed forwardly.

In testimony whereof I affix my signature.

ALLEN H. ROGERS. [L. S.]